United States Patent
Tong et al.

(10) Patent No.: US 8,039,572 B2
(45) Date of Patent: Oct. 18, 2011

(54) SHAPE MEMORY CYANATE ESTER COPOLYMERS

(75) Inventors: Tat Hung Tong, Bellbrook, OH (US); Richard Douglas Hreha, Beavercreek, OH (US); Benjamin John Vining, Dayton, OH (US)

(73) Assignee: Cornerstone Research Group, Inc., Dayton, OH (US)

( * ) Notice: Subject to any disclaimer, the term of this patent is extended or adjusted under 35 U.S.C. 154(b) by 847 days.

(21) Appl. No.: 11/568,687

(22) PCT Filed: May 5, 2005

(86) PCT No.: PCT/US2005/015685
§ 371 (c)(1), (2), (4) Date: Jul. 16, 2007

(87) PCT Pub. No.: WO2005/108448
PCT Pub. Date: Nov. 17, 2005

(65) Prior Publication Data
US 2008/0021188 A1    Jan. 24, 2008

Related U.S. Application Data

(60) Provisional application No. 60/569,368, filed on May 6, 2004.

(51) Int. Cl.
*C08F 283/04* (2006.01)
*C08F 283/00* (2006.01)
*C08G 69/48* (2006.01)
*C08G 69/00* (2006.01)

(52) U.S. Cl. ........... 528/28; 528/212; 528/374; 528/422
(58) Field of Classification Search .................. 528/28, 528/212, 374, 422
See application file for complete search history.

(56) References Cited

U.S. PATENT DOCUMENTS

| 5,145,935 | A |   | 9/1992 | Hayashi |         |
|-----------|---|---|--------|---------|---------|
| 5,506,300 | A |   | 4/1996 | Ward et al. | |
| 5,665,822 | A |   | 9/1997 | Bitler et al. | |
| 5,856,022 | A | * | 1/1999 | McCormick et al. | 428/500 |
| 6,759,481 | B2|   | 7/2004 | Tong et al. | |

OTHER PUBLICATIONS

Gorden, Richard F., Applications of Shape Memory Polyurethanes, Proceedings of the First International Conference on Shape Memory and Superelastic Technologies, SMST International Committee, pp. 115-119 (1994).

* cited by examiner

*Primary Examiner* — Duc Truong

(57) ABSTRACT

Cyanate ester shape memory polymers (SMP). The polymers are preferably formed via reaction of a multifunctional cyanate ester and a mono functional cyanate ester and exist, in one inventive aspect, in the form of a cross-linked thermoset network. Optional catalysts and structural modifiers may be added to the reaction moieties to help control the glass transition temperature of the resulting SMP to greater than 0° C., preferably from about 150° C.-300° C.

4 Claims, No Drawings and has a glass transition temperature rather than a melting point. In other embodiments, the soft segment is crystalline and has a melting point rather than a glass transition temperature. The melting point or glass transition temperature of the soft segment is substantially less than the melting point or glass transition temperature of the hard segment. Examples of polymers used to prepare hard and soft segments of known SMPs include various polyacrylates, polyamides, polysiloxanes, polyurethanes, polyethers, polyether amides, polyurethane/ureas, polyether esters, and urethane/butadiene copolymers.

SHAPE MEMORY CYANATE ESTER COPOLYMERS

CROSS REFERENCE TO RELATED APPLICATION

This application claims priority from provisional application, Ser. No. 60/569,368, filed May 6, 2004, which application is incorporated herein by reference.

BACKGROUND OF THE INVENTION

1. Field of Invention

The present invention is directed to shape memory polymers (SMPs), their production and use. More particularly, the current invention comprises a reaction product of a monofunctional cyanate ester and a multifunctional cyanate ester in the form of a cross-linked thermoset network in the presence of a catalyst, structural modifier, neither, or both. The present invention is specifically drawn toward space applications as cyanate ester is already an approved compound for use in space applications. The need for a SMP that is approved for use in space is obvious to those that work in the space field. A material that can be compacted for launch and then unfolded in space while maintaining high toughness and being lightweight would significantly reduce the costs of sending objects into space. The present invention is also drawn to a shape memory polymer thermosetting resin having compatibility with polymers employed in high temperature, high strength and high tolerance processes in manufacturing.

2. Background of Prior Art

Shape memory materials are materials capable of distortion above their glass transition temperatures ($T_g$s). They store such distortion at temperatures below their $T_g$ as potential mechanical energy in the material, and release this energy when heated again to above the $T_g$, returning to their original "memory" shape.

The first materials known to have these properties were shape memory metal alloys (SMAs), including TiNi (Nitinol), CuZnAl, and FeNiAl alloys. These materials have been proposed for various uses, including vascular stents, medical guide wires, orthodontic wires, vibration dampers, pipe couplings, electrical connectors, thermostats, actuators, eyeglass frames, and brassiere underwires. With a temperature change of as little as 10° C., these alloys can exert a stress as large as 415 MPa when applied against a resistance to changing its shape from its deformed shape. However, these materials have not yet been widely used, in part because they are relatively expensive.

Shape memory polymers (SMPs) are being developed to replace or augment the use of SMAs, in part because the polymers are light weight, high in shape recovery ability, easy to manipulate, and economical as compared with SMAs. SMPs are materials capable of distortion above their glass transition temperature ($T_g$), storing such distortion at temperatures below their $T_g$ as potential mechanical energy in the polymer, and release this energy when heated to temperatures above their $T_g$, returning to their original memory shape. When the polymer is heated to near its transition state it becomes soft and malleable and can be deformed under resistances of approximately 1 MPa modulus. When the temperature is decreased below its $T_g$, the deformed shape is fixed by the higher rigidity of the material at a lower temperature while, at the same time, the mechanical energy expended on the material during deformation will be stored. Thus, favorable properties for SMPs will closely link to the network architecture and to the sharpness of the transition separating the rigid and rubbery states.

Heretofore, numerous polymers have been found to have particularly attractive shape memory effects, most notably the polyurethanes, polynorbornene, styrene-butadiene copolymers, and cross-linked polyethylene.

In literature, SMPs are generally characterized as phase segregated linear block co-polymers having a hard segment and a soft segment. The hard segment is typically crystalline, with a defined melting point, and the soft segment is typically amorphous, with a defined glass transition temperature. In some embodiments, however, the hard segment is amorphous The limitations with existing shape memory polymers lie in the thermal characteristics and tolerances of the material. Operational activation temperature, the $T_g$, may be low for conditions in which the system will reside, leading to the material being incapable of activation. An example of such a situation is a hot region with an ambient temperature exceeding the transition temperature of the SMP; such a climate would not allow the polymer to efficiently make use of its rigid phase. Additionally, current organic systems from which SMPs are synthesized are not capable of operating in adverse environments that degrade polymeric materials. An example of such an environment is low earth orbit, where intense radiation and highly reactive atomic oxygen destroy most organic materials.

Applications for a shape memory material capable of withstanding these harsh conditions as well as higher thermal loads include, but are not limited to; morphing aerospace structures and space compatible polymers capable of self-actuation and dampening.

Conventional shape memory polymers generally are segmented polyurethanes and have hard segments that include aromatic moieties. U.S. Pat. No. 5,145,935 to Hayashi, for example, discloses a shape memory polyurethane elastomer molded article formed from a polyurethane elastomer polymerized from of a difunctional diiiosicyanate, a difunctional polyol, and a difunctional chain extender.

Examples of polymers used to prepare hard and soft segments of known SMPs include various polyethers, polyacrylates, polyamides, polysiloxanes, polyurethanes, polyether amides, polyurethane/ureas, polyether esters, and urethane/butadiene copolymers. See, for example, U.S. Pat. No. 5,506,300 to Ward et al.; U.S. Pat. No. 5,145,935 to Hayashi; U.S. Pat. No. 5,665,822 to Bitler et al.; and Gorden, "Applications of Shape Memory Polyurethanes," Proceedings of the First International Conference on Shape Memory and Superelastic Technologies, SMST International Committee, pp. 115-19 (1994).

Recently, however, SMPs have been created using reactions of different polymers to eliminate the need for a hard and soft segment, creating instead, a single piece of SMP. U.S. Pat. No. 6,759,481 discloses such a SMP using a reaction of styrene, a vinyl compound, a multifunctional crosslinking agent and an initiator to create a styrene based SMP.

When the SMP is heated above the melting point or glass transition temperature of the hard segment, the material can be shaped. This (original) shape can be memorized by cooling the SMP below the melting point or glass transition temperature of the hard segment. When the shaped SMP is cooled below the melting point or glass transition temperature of the soft segment while the shape is deformed, a new (temporary) shape is fixed. The original shape is recovered by heating the material above the melting point or glass transition temperature of the soft segment but below the melting point or glass transition temperature of the hard segment. The recovery of the original shape, which is induced by an increase in temperature, is called the thermal shape memory effect. Properties that describe the shape memory capabilities of a material are the shape recovery of the original shape and the shape fixity of the temporary shape.

Several physical properties of SMPs other than the ability to memorize shape are significantly altered in response to external changes in temperature and stress, particularly at the melting point or glass transition temperature of the soft segment. These properties include the elastic modulus, hardness, flexibility, vapor permeability, damping, index of refraction, and dielectric constant. The elastic modulus (the ratio of the stress in a body to the corresponding strain) of an SMP can change by a factor of up to 200 when heated above the melting point or glass transition temperature of the soft segment. Also, the hardness of the material changes dramatically when the soft segment is at or above its melting point or glass transition temperature. When the material is heated to a temperature above the melting point or glass transition temperature of the soft segment, the damping ability can be up to five times higher than a conventional rubber product. The material can readily recover to its original molded shape following numerous thermal cycles, and can be heated above the melting point of the hard segment and reshaped and cooled to fix a new original shape.

The industrial use of SMPs has been limited because of their low transition temperatures. Cyanate esters are a unique class of material which possesses attractive thermal and mechanical properties. In applications where high rigidity and high temperature resistant materials are needed, cyanate esters demonstrate compatibility by maintaining their rigid glassy modulus at high temperature as well as possessing a stable chemical structure resistant to conditions such as oxidation and radiation exposure. Cyanate esters polymerize thermally producing a highly dense crosslinked network. Typically these thermoset cyanate ester networks are rigid and have low strain capability. By altering this network system, it is possible to produce a lightly crosslinked network still possessing many of the original materials properties but with the functionality of a shape memory polymer. Currently there is no shape memory polymer capable of withstanding very high temperatures and pressures for use in industrial applications. Thus there is a need for a SMP that can be used at the high temperatures used in manufacturing processes. Because Cyanate Esters are already a space qualified material, the present invention would be highly useful for space applications because it is lightweight, strong, and has the ability to change shape.

SUMMARY OF THE INVENTION

The cyanate ester based shape memory polymers (SMPs) with a high glass transition temperature ($T_g$) that are described in this invention are well adapted for industrial use in making SMP Molds, as set forth in U.S. patent application Ser. No. 10/056,182, or for use in other industrial and manufacturing processes.

As previously stated, SMPs are a unique class of polymers that can harden and soften quickly and repetitively on demand. This feature provides the ability to soften temporarily, change shape, and harden to a solid structural shape in various new highly detailed shapes and forms. SMPs have a very narrow temperature span in which they transition from hard to soft and back again. By using different combinations of cyanate ester in addition to structural modifiers and catalyst the $T_g$ can be tailored to required narrow temperature ranges. This narrow glass transition temperature ($T_g$) range is a key property that allows a SMP to maintain full structural rigidity up to the specifically designed activation temperature. SMPs possessing high $T_g$, such as described here, are particularly useful in applications that will change shape at some stage but need the structure to stay rigid at higher operating temperatures (greater than 0° C.), such as morphing aerospace structures and SMP molding processes.

In accordance with the invention, a new SMP with high temperature capability (greater than 0° C.) has now been developed.

In accordance with the present invention, the SMPs are a reaction product of a monofunctional cyanate ester monomer and at least one multifunctional cyanate ester monomer. The polymerization of the reaction of these monomers forms a castable shape memory polymer with a glass transition temperature higher than 0° C. The reaction creates a crosslinking between the monomers such that during polymerization they form a thermoset network. Additionally, structural modifiers or catalysts can also be used to assist in tailoring cyanate ester SMP to achieve a specific $T_g$. The transition temperatures of the final polymers are adjusted by the ratio of the materials used so that the resulting polymer has a $T_g$ from about 0° C. to about 300° C. with one aspect of the invention concerned with SMPs having glass transition temperatures of greater than 150° C.

DETAILED DESCRIPTION OF EXEMPLARY EMBODIMENTS

The cyanate ester based shape memory polymers (SMPs) are crosslinked based on a monofunctional and multifunctional cyanate ester monomer. It is preferred that the SMP is formed from a difunctional cyanate ester and a monofunctional cyanate ester. Additionally some embodiments use structural modifiers and catalysts either separately or together to create a SMP with a specific transition temperature ($T_g$).

Generally, shape memory polymers (SMPs) are comprised of two essential components; the back bone polymer, which is comprised of monomeric constituents that undergo polymerization to produce polymers possessing specific glass transition temperatures ($T_g$s), and a crosslinking agent. The mixture of monomers can be formulated so that the glass transition temperatures can be tuned to meet different operational needs for specific applications. In cyanate ester materials, the monomer functional groups tri-polymerize, forming a highly crosslinked network synonymous with crosslinked thermosetting systems.

Cyanate ester monomers possessing dual functionality are those most commonly used to produce such thermosetting resins. Different cyanate ester monomers can polymerize with one another, yielding a polymer with a blend of characteristics from the unique polymeric components. When a cyanate ester monomer possessing only one functional group is added to the resin, these monofunctional monomers react via the tri-polymerization with the multifunctional monomers, causing a reduction in the extent of crosslinking in the network by "capping" the polymerization sites. This will cause an increase in the length of the polymer chains between crosslink sites, modifying the material to one whose system more closely resembles a conventional SMP.

In the preferred embodiment of the present invention 1,1-bis(4-cyanatophenyl) ethane is the primary multifunctional component of the investigated SMP and the monofunctional component of the investigated polymer system is 4-cumylphenol cyanate ester which serves to control crosslink density. Additionally, the preferred embodiment may employ a catalyst to assist the polymerization of the two monomers. The amounts of each monomer added will vary depending on the physical properties desired. Blends of these two components were varied from 1:1 molar mixtures to 4:1 for both components. Additionally, a metal catalyst was added to facilitate cure in the material. This catalyst was equal for all samples and exists in quantities of 81 parts per thousand of elemental zinc in the material.

Any multifunctional cyanate ester compound having an average of more than one cyanate ester moiety per molecule could be used as the multifunctional monomer. Suitable monomers include but are not limited to: 2,2'-bis(4-cyanatophenyl)isopropylidene; 2,2'-bis(4-cyanatophenyl)-1,1,1,3,3,3-hexafluoroisopropylidene; 1,1'-bis(4-cyanatophenyl) ethane; 4,4'-Ethylidinediphenyl dicyanate; bis(4-cyanatophenyl)methane; 1,3-bis(4-cyanatophenyl)-1-(1-methylethylidene)) benzene; bis (4-cyanatophenyl)thioether; bis(4-cyanatophenyl)ether, resorcinol dicyanate, combinations thereof and the like.

Any compound having one cyanate ester moiety per molecule could be used as the monofunctional monomer. Suitable monomers include but are not limited to: 4-nonylphenyl cyanate ester, 4-phenylphenyl cyanate ester, 4-cumylphenol cyanate ester, and phenyl cyanate ester.

Types of catalyst that may be used include, but are not limited to, acids, bases, nitrogen or phosphorus compounds, transition metal salts or complexes, such as metal salts of aliphatic and aromatic carboxylic acids, tertiary amines, combinations thereof and the like. Particularly suitable catalysts include, for example, cobalt octoate, cobalt naphthenate, cobalt acetylacetonate $(Co(AcAc)_3)$, zinc octoate, zinc naphthenate, tin octoate, diazobicyclo-(2,2,2)-octane, triethylamine, combinations thereof and the like, often in combination with active hydrogen containing co-catalysts. The co-catalyst both serves as a solvent for the transition metal catalyst and aids in the ring closure of the triazine ring via hydrogen transfer. Suitable co-catalysts include alkyl phenols such as nonylphenol, bisphenols, alcohols, imidazoles or aromatic amines. Special organometallic initiators such as tricarbonylcyclo-pentadienyl manganese $(CpMn(CO)_3)$ can also be used to allow the cyanate ester SMP resins to be cured by irradiation of UV light or electron beam at a lower curing temperature. These catalysts are employed in amounts of from about 0.0001% to about 2.0%, and more preferably from about 0.01% to about 0.1% percent by weight based on total polycyanate resin. The catalyst may also be used to alter the glass transition temperature of the product.

As previously stated, in the preferred embodiment of the present invention 1,1-bis(4-cyanatophenyl) ethane is the primary multifunctional component of the investigated SMP and the monofunctional component of the investigated polymer system is 4-cumylphenol cyanate ester which serves to control crosslinking density. The constituents of the SMP reaction mixture are present such that the monofunctional cyanate ester monomer represents between about 5% and 80%, more preferably from 35% to 60%, and the multifunctional cyanate ester monomer or monomers represent between 5% and 95%, more preferably from 40% to 65%, all of the above recited percentages being by weight based on the total weight of the SMP mixture (100 wt %).

The SMP reaction mixture is polymerized by reacting the mixture at a temperature in the range of between 20° C. and 300° C. and a pressure in the range of between about 14.7 psi and about 50 psi over a time period in the range of between about 2 seconds and 4 days to produce a crosslinked SMP. Additionally other curing methods such as E-beam, radiation, light, and other processes could be used to cure the SMP mixture.

In the preferred embodiment, the polymerization reaction, to produce the thermosetting shape memory polymer of the present invention occurs at a temperature in the range between approximately 150° C. and 270° C., more preferably between 180° C. and 220° C. and a pressure in the range of about 14.7 psi over a period of between about 4 hours and about 2 days, more preferably from 18 to 25 hours. The resulting SMP has a $T_g$ of between approximately 0° C. and 300° C.

Additionally, structural modifiers may be used to allow for the SMP to be designed for a specific $T_g$, toughness, and flexibility depending on the desired specifications. These structural modifiers can be used with or without a catalyst. Examples of structural modifiers include but not limited to those listed below as well as their fluorinated derivatives:

Poly(butadiene), hydroxyl terminated; Poly(butadiene), hydroxyl functionalized;
Poly(isoprene), hydroxyl terminated; Poly(isoprene), hydroxyl functionalized;
Poly(chloroprene), hydroxyl terminated; Poly(chloroprene) hydroxyl functionalized;
Poly(tetrahydrofuran); Poly(terathydrofuran) bis(3-aminopropyl) terminated;
Poly(propylene glycol); Poly(ethylene glycol)-block-poly(propylene glycol)-block-poly(ethylene glycol); Poly(propylene glycol)bis(2-aminopropylether); Poly(1,4-butanediol)bis(4-aminobenzoate); Chitosan; Poly(2-methyl-1,3-propylen glutarate) hydroxyl terminated; Poly(lauryllactam)-block-poly(tetrahydrofuran);
Poly(dimethylsiloxane) hydroxyl terminated; Ethylene glycol bis(propylene glycol-B-ethylene glycol) ether; Poly(acrylonitrile-co-butadiene), amine terminated; Poly(1,4-phenylene ether-ether sulfone) hydroxyl terminated; Poly(sulfone) hydroxyl terminated; Poly(phenyl sulfone) hydroxyl terminated; Poly(dimethylsiloxane), dihydroxy terminated; Poly(diphenylsiloxane), dihydroxy terminated;
Poly(dimethylsiloxane-co-diphenylsiloxane), dihydroxy terminated; Poly(2-methyl-1,3-propylene glutarate), hydroxyl terminated; Poly(tetrafluoroethylene oxide-co-difluoromethylene oxide)∝,ω-diol; Poly(vinyl chloride-co-vinyl acetate-co-vinyl alcohol); 1,3-propanediol
1,2-propanediol; 2-methyl-1,3-propanediol; neopentyl glycol; 2-ethyl-2-methyl-1,3-propanediol; 2,2-diethyl-1,3-propanediol; 2-methyl-2-propyl-1,3-propanediol; 2-butyl-2-ethyl-1,3-propanediol; 1,4-butanediol; 1,3-butanediol; 1,2-butanediol; 2,3-butanediol; 3,3-dimethyl-1,2-butanediol; 1,5-pentanediol; 1,4-pentanediol; 1,2-pentanediol; 2,4-pentanediol; 2-methyl-2,4-pentanediol; 2-methyl-2,4-pentanediol; 2,4-dimethyl-2,4-pentanediol; 2,2,4-trimethyl-1,3-pentanediol; 1,6-hexanediol; 1,5-hexanediol
1,3-hexanediol; 2,5-hexanediol; 2-ethyl-1,3-hexanediol; 2,5-dimethyl-2,5-hexanediol; 1,7-hexanediol; 1,8-octanediol; 1,2-octanediol; 1,9-nonanediol; 1,10-decanediol; 1,2-decanediol; 1,12-dodecanediol; 1,2-dodecanediol; 1,14-tetradecanediol; 1,2-tetradecanediol; 1,16-hexadecanediol; 1,2-hexadecanediol; 1,4-cyclehexanediol; 4,4'-isopropylidenedicyclohexanol; Cis-1,5-cyclooctanediol; Cis-exo-2,3-norbornanediol; 1,5-decalindiol; 3-fluoro-1,2-propanediol; 2,2,3,3,4,4-hexafluoro-1,5-pentanediol; 2,2,3,3,4,4,5,5-octafluoro-1,6-hexanediol; 2,2,3,3,4,4,5,5,6,6,7,7,8,8,9,9-hexadecafluoro-1,10-decanediol; 1,2,6-trihydroxyhexane; 1,2-diaminopropane; 1,3-diaminopropane; 1,4-diaminobutane; 1,5-diaminopentane; 2,2-dimethyl-1,3-propanediamine; hexamethylenediamine; dytek A amine; 1,7-diaminoheptane; 1,8-diaminooctane; 1,9-diaminononane; 1,10-diaminodecane; 1,12-diaminododecane; N-methylethylenediamine; N-ethylethylenediamine; N-propylethylethylenediamine; N-isopropylethylenediamine; N,N'-dimethylethylenediamine; N,N'-diethylethylenediamine; N,N'-diisopropylethylenediamine; N-propyl-1,3-propanediamine; N-isopropyl-1,3-propanediamine; N,N'diisopropyl-1,3-propanediamine; 2-butyl-2-ethyl-1,5-pentanediamine; N,N'-dimethyl-1,6-hexanediamine; 3,3-diamino-N-methyldipropylamine; N-(3-aminopropyl)-1,3-propanediamine; 3,3'-iminobis(N,N'-dimethylpropylamine); 1,8-diamino-P-menthane; 5-amino-1,3,3-trimethylcyclohexanemethylamine; 2,2-(ethylenedioxy)-bis(ethylamine); 4,9-dioxa-1,12-dodcanediamine; 4,7,10-trioxa-1,13-tridecanediamine; 3-amino-1-propanol; 4-amino-1-butanol; 2-amino-1-butanol; 5-amino-1-pentanol; 6-amino-1-hexanol; 2-amino-2-methyl-1-propanol; 2-(2-aminoethoxy)ethanol; 2-(methylamino)ethanol; DL-2-amino-1-hexanol; 2-(ethylamino)ethanol; 2-(propylamino)ethanol; 2-(tert-Butylamino)ethanol; Diethanolamine; Diisopropanolamine; N,N'-bis(2-hydroxyethyl)-ethylenediamine; 2-(butylamino)ethanethiol; 3-pyrrolidinol; 3-piperidinemethanol; 3-piperidineethanol; 3-piperidinepropanol; 3-piperidinebutanol; 4-hydroxypiperidine; 4,4'-trimethylenebis(1-piperidineethanol); 4,4'-trimethylenedipiperidine; 4-(aminomethyl)piperidine; 3-(4-aminobutyl)piperidine; N, N'-bis(2,2,6,6-tetramethyl-4-piperidinyl)-1,6-hexanediamine; 1,4,10-trioxa-7,13-diazacyclopentadecane; 1,4-butanedithiol; 2,3-butanedithiol; 1,5-pentanedithiol; 1,6-hexanedithiol; 1,8-octanedithiol; 1,9-nonanedithiol; 3-mercapto-1-propanol; 3-mercapto-2-butanol; 2-mercaptoethyl ether; 2,2'-thiodiethanol; 2-hydroxyethyl disulfide; 3,6-dithia-1,8-octanediol; 3,3'-thiodipropanol; 3-methylthio-1,2-propanediol; 2-mercaptoethyl sulfide; di(ethylene glycol); di(propylene glycol); tri(ethylene glycol); tri(propylene glycol); tetra(ethylene glycol); penta(ethylene glycol); hexa(ethylene glycol); 1,1'bi-2-napthol; 1,5-dihydroxynapthalene; 1,6-dihydroxynapthalene; 2,6-dihydroxynaphthalene; 2,7-dihydroxynapthalene; 4,4'-(9-fluorenylidene)-diphenol; anthrarobin; bis(2-hydroxyphenyl)methane; hydroquinone; methyoxyhydroquinone; diethylstilbestrol; bis(4-hydroxyphenyl)methane; bisphenol A; 4,4-(hexafluoroisopropylidene)diphenol; 2,2-bis(4-hydroxy-3-methylphenyl)propane; Meso-hexestrol; Nordihydroguaiaretic acid; Hydrobenzoin; Benzopinacole; 2,2'-(1,2-phenylenedioxy)diethanol; 2,2-dimethyl-1-phenyl-1,3-propanediol; 3-hydroxybenzyl alcohol; 1,3-benzendimethanol; Alpha, alpha, alpha', alpha'-tetramethyl-1,3-benzenedimethanol; Alpha, alpha, alpha', alpha'-tetrakis(trifluoromethyl)-1,3-benzenedimethanol; 3-aminobenzyl alcohol; 1,4-benzenedimethanol; 3-hydroxy-4-methoxybenzyl alcohol; 2,2'-biphenyldimethanol; 2-benzyloxy-1,3-propanediol; 2-(2-hydroxyethoxy)phenol; 4-hydroxyphenethyl alcohol; 3-(4-methoxyphenyl)-1-propanol; hydroquinone bis(2-hydroxyethyl)ether; homovanillyl alcohol; 1,4-benzenedimethanethiol; 1,2-benzenedithiol; 1,2-benzenedimethanethiol; 1,3-benzenedithiol; 1,3-benzenedimethanethiol; 4-chloro-1,3-benzenedithiol; 2,4,6-trimethyl-1,3-benzenedimethanethiol; 3-tert-butyl-4-hydroxy-5-methylphenyl sulfide; 3-tert-butyl-4-hydroxy-2-methylphenyl sulfide; 2,2'-thiobis(4-tert-octylphenol); 4-(methylthio)benzyl alcohol; 4,4'-thiodiphenol; 4,4'thiobisbenzenethiol; 2-aminophenol; 2-aminobenzyl alcohol; 2-aminophenethyl alcohol; 2-aminothiophenol; 2-aminophenyl disulfide; 3-aminophenol; 3-aminobenzyl alcohol; 3-aminophenethyl alcohol; 3-aminothiophenol; 3-(1-hydroxyethyl)aniline; 4,4'-ethylenedianiline; 3,3'-methylenedianiline; 4,4'methylenedianiline; 4,4'-oxydianiline; 4'',4'''-(hexafluoroisopropylidene)-bis(4-phenoxyaniline); 3-aminophenol; 4-aminothiophenol; 4,4'thiodianiline; 4-aminophenethyl alcohol; o-tolidine; 4,4'-ethylenedi-m-toluidine; 5,5'-(hexafluoroisopropylidene)-di-o-toluidine; 5-amino-2-methoxyphenol; 2-amino-3-methylbenzyl alcohol; 4,4'-methylenebis(2,6-dimethylaniline); 4,4'-methylenebis(2,6-diethylaniline); 4,4'-methylenebis(2,6-diisopropylaniline); 3,3',5,5'-tetramethylbenzidine; 1,2-phenylenediamine; N-methyl-1,2-phenylenediamine; 2,3-diaminotoluene; 1,3-phenylenediamine; N,N'-diphenyl-1,4-phenylenediamine; N,N'-diphenylbenzidine; N-phenyl-1,4-phenyldiamine; N-methyl-4,4'-methylenediailine; 3,3'(hexafluoroisopropylidene)dianiline; 4,4'-(hexafluoroisopropyledene)dianiline; 3,3'-dimethoxybenzidine; 3-hydroxydiphenylamine; N-(4-hydroxyphenyl)-2-naphthylamine; 3,3'-dimethylnaphthidine; 1,5-diaminonaphthalene; 2,7-diaminofluorene; 3,7-diamino-2-methoxyfluorene; 2-amino-9-hydroxyfluorene; 2-aminobenzylamine; 4-aminobenzylamine; Tyramine; 2',6'-dihydroxyacetophenone; 2',4'-dihydroxyacetophenone; 2',5'-dihydroxyacetophenone; 2',4'-dihydroxypropiophenone; 2',5'-dihydroxypropiophenone; 4,4'-dihydroxybenxophenone; 4,4'-diaminobenzophenone.

The glass transition temperature of the shape memory polymer can be also be tailored by altering the mixture of monofunctional and difunctional monomers. The transition temperature can also be tailored by the combination of different difunctional monomers to the mixture such that more than one difunctional or multifunctional monomer is added to a single mixture. The resulting formulations all showed the ability to expand 0-20% of their original size before critical deformation occurred. Additionally some formulations showed the ability to expand 0-100% of their original size before critical deformation occurred.

The invention will now be further described with reference to a number of specific examples which are to be regarded solely as illustrative and not as restricting the scope of the invention.

Example 1

A 2:3 molar mixture of 4-cumylphenol cyanate ester: 1,1' Bis(4-cyanatophenyl) ethane was combined. To the mixture was added a sufficient quantity of zinc catalyst complex suspended in nonylphenol to reach 81 parts per thousand of catalyst in the monomer. The described mixture was polymerized by heating through a cure cycle of 80° C., 100° C., 120° C., 150° C. for 2 hours each, then 177° C. for 4 hours. To prepare the shape memory polymer a mold was fabricated consisting of a 3" by 3" glass plate with a Viton ring encompassing the mold area. The reaction mixture formulated above was poured into the area encircled by the Viton. The mold was sealed by placing a 3" by 3" glass plate on top of the Viton ring. The two sheets of glass were held together by clamps around the edges. The Viton spacer also acts as a sealant in the mold. The sample was heated in an oven at 200° C. for 4 hours to obtain an SMP with $T_g$ of 160° C. After the sample was cured for the specified period of time, it was removed from the oven and demolded by applying a slight prying force at the edges of the mold.

At the conclusion of this polymerization process a transparent orange sheet of a cured shape memory polymer was obtained.

Example 2

A polymeric reaction mixture was formulated by mixing 4,4'-ethylidinediphenyl dicyanate (44.2%), 4-cumylphenol cyanate ester (40.7%) and hydroxyl terminated poly(butadiene) (15.01%) in random order to yield a pale yellow opaque solution. To aid in mixing, the resulting solution was heated at 85° C. for 4 hours with intermittent mixing to yield a clear yellow solution. To prepare the shape memory polymer a mold was fabricated consisting of a 3" by 3" glass plate with a Viton ring encompassing the mold area. The reaction mixture formulated above was poured into the area encircled by the Viton. The mold was sealed by placing a 3" by 3" glass plate on top of the Viton ring. The two sheets of glass were held together by clamps around the edges. The Viton spacer also acts as a sealant in the mold. The sample was heated at atmospheric pressure in an oven at 165° C. for 12 hours followed by a period at 220° C. for 5 hours. After the sample was cured for the specified period of time, it was removed from the oven and demolded by applying a slight prying force at the edges of the mold.

At the conclusion of this polymerization process a transparent orange sheet of a cured shape memory polymer was obtained.

Example 3

A polymeric reaction mixture was formulated by mixing 4,4'-ethylidinediphenyl dicyanate (52.1%) and 4-cumylphenol cyanate ester (47.9%) to yield a pale yellow solution. To aid in mixing, the resulting solution was heated at 85° C. for 4 hours with intermittent mixing to yield a clear yellow solution. To prepare the shape memory polymer a mold was fabricated consisting of a 3" by 3" glass plate with a Viton ring encompassing the mold area. The reaction mixture formulated above was poured into the area encircled by the Viton. The mold was sealed by placing a 3" by 3" glass plate on top of the Viton ring. The two sheets of glass were held together by clamps around the edges. The Viton spacer also acts as a sealant in the mold. The sample was heated at atmospheric pressure in an oven at 165° C. for 12 hours followed by a period at 220° C. for 5 hours. After the sample was cured for the specified period of time, it was removed from the oven and demolded by applying a slight prying force at the edges of the mold.

At the conclusion of this polymerization process a transparent orange sheet of a cured shape memory polymer was obtained.

Example 4

A polymeric reaction mixture was formulated by mixing 1,3-bis-(3'-(2-cyanatophenyl)propyl)-1,1,3,3-tetramethyldisiloxane (60.0%) and 4-cumylphenol cyanate ester (40.0%) in random order to yield a pale yellow solution. To prepare the shape memory polymer a mold was fabricated consisting of a 3" by 3" glass plate with a Viton ring encompassing the mold area. The reaction mixture formulated above was poured into the area encircled by the Viton. The mold was sealed by placing a 3" by 3" glass plate on top of the Viton ring. The two sheets of glass were held together by clamps around the edges. The Viton spacer also acts as a sealant in the mold. The sample was heated at atmospheric pressure in an oven at 150° C. for 90 minutes followed by a period at 175° C. for 4 hours and then 195° C. for 16.5 hours followed by 3.5 hours at 220° C. After the sample was cured for the specified period of time, it was removed from the oven and demolded by applying a slight prying force at the edges of the mold.

At the conclusion of this polymerization process a transparent orange sheet of a cured shape memory polymer was obtained.

Example 1 shows how a catalyst is used to assist the polymerization in obtaining a SMP with a $T_g$ greater than 150° C. Example 2 demonstrates the use of a structural modifier to adjust the $T_g$ of the SMP to a desired temperature. Example 3 demonstrates the SMP achieved from a mixture of just a monofunctional and difunctional cyanate ester. Example 4 demonstrates a SMP with a relatively low $T_g$, approximately 20° C., which retains its high strength and is good for use in space applications.

The shape memory phenomenon in the vicinity of $T_g$ and the ability to set the value of $T_g$ by varying the composition over a very broad range of temperatures allows contemplation of numerous applications in varied uses including, but not limited to, molds for contact lenses manufacturing, molds for composite manufacturing, structural deployment devices for remote systems, games and toys, domestic articles, arts and ornamentation units, medical and paramedical instruments and devices, thermosensitive instruments and security devices, office equipment, garden equipment, educative articles, tricks, jokes and novelty items, building accessories, hygiene accessories, automotive accessories, films and sheets for retractable housings and packaging, coupling material for pipes of different diameters, building games accessories, folding games, scale model accessories, bath toys, boots and shoes inserts, skiing accessories, suction-devices for vacuum cleaners, pastry-making accessories, camping articles, adaptable coat hangers, retractable films and nets, sensitive window blinds, isolation and blocking joints, fuses, alarm devices, sculpture accessories, adaptable hairdressing accessories, plates for braille that can be erased, medical prosthesis, orthopedic devices, furniture, deformable rulers, recoverable printing matrix, formable casts/braces, shoes, form-fitting spandex, form-fitting clothes, self-ironing clothes, self-fluffing pillow, deployable structures, space deployable structures, satellites, and pipe replacement for underground applications.

In general terms, the SMP is prepared from a reaction mixture comprising a monofunctional cyanate ester monomer and at least one multifunctional cyanate ester monomer. The resulting shape memory polymer has a glass transition temperature of greater than about 0° C. and is preferably present in the form of a crosslinked thermoset network.

In one embodiment of the invention, the multifunctional cyanate ester is a difunctinoal cyanate ester. The difunctional cyanate ester monomer may have the formula (I).

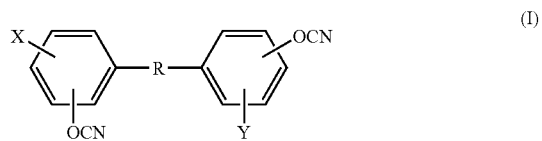

wherein R is H, alkyl, preferably $C_1$-$C_{12}$ alkyl, aryl, perfluro, O, $SO_2$, $SiR'_2$, $SiR'_2O_2$ or other organosiloxane moiety, wherein R' can be H, $C_1$-$C_{12}$ alkyl or aryl, wherein X and Y can be the same or different and can be H, $C_1$-$C_{12}$ alkyl, aryl, halogen, nitrile, $NO_2$, $SO_2$, cyanate ester, alkyl ether, or aryl ether.

As will be understood by those skilled in the art, the location of the X, Y, and OCN groups may be at any of the ring positions and is not limited. For example, the shape memory polymer can have a symmetrical substitution of the OCN groups in relation to the R groups. Also, the OCN groups can be located ortho, para, or meta, relative to R.

In some cases, the OCN groups can have an unsymmetrical substitution relative to R. For example, one OCN group may be ortho to R with another OCN group being in the meta position. Further, one OCN group may be para and another ortho. Para and meta orientations for the OCN groups relative to R may also be mentioned as exemplary.

The monofunctional cyanate ester may have the formula II

$$R'''—OCN \qquad (II)$$

wherein R''' is a monovalent polymeric moiety, monovalent hydrocarbyl moiety, preferably $C_1$-$C_{12}$ alkyl group, aryl moiety such as phenyl or biphenyl, or arylalkyl aryl moiety such as Z-M-Z wherein Z is phenyl and M is an alkyl radical having from 1-6 C atoms.

The optional structural modifier may have the formula (III)

$$D'-X'—R'' \qquad (III)$$

wherein D' and R'' are independently selected from an alcohol, primary amine, secondary amine, or thiol moiety or combination thereof. X' can be H, $C_1$-$C_{12}$ alkyl, aryl or an organosiloxane moiety. Preliminary research indicates that hydroxy end capped polybutadiene and 1,12 dodecanediol may be beneficially useful as structural modifiers.

While certain features of this invention have been described in detail with respect to various embodiments thereof, it will, of course, be apparent that other modifications can be made within the spirit and scope of the invention, and it is not intended to limit the invention to the exact detail shown above except insofar as there defined in the appended claims.

What is claimed is:

1. Shape memory polymer prepared from a reaction mixture comprising a monofunctional cyanate ester monomer, at least one multifunctional cyanate ester monomer, and a catalyst, wherein said shape memory polymer is prepared from said reaction mixture by heating said reaction mixture to at least one predetermined temperature, pouring said reaction mixture into a mold forming a desired shape, and curing said reaction mixture in said mold for a predetermined amount of time and at least one predetermined curing temperature to create said shape memory polymer having a glass transition temperature of about greater than 0° C.

2. Shape memory polymer as recited in claim 1 wherein said polymer is present in the form of a cross-linked thermoset network and has a glass transition temperature of greater than 150° C.

3. Shape memory polymer as recited in claim 1 wherein said nonfunctional cyanate ester monomer is 4-cumylphenol cyanate ester.

4. Shape memory polymer as recited in claim 1 wherein said multifunctional cyanate ester monomer is 1,1'-bis(4-cyanatophenyl)ethane.

* * * * *